(12) United States Patent
Kim et al.

(10) Patent No.: US 7,968,643 B2
(45) Date of Patent: Jun. 28, 2011

(54) GRAFT COPOLYMER FOR TRANSPARENT THERMOPLASTIC POLYURETHANE RESIN, PREPARATION METHOD THEREOF, AND POLYURETHANE RESIN COMPOSITION CONTAINING THE SAME

(75) Inventors: Yoon-ho Kim, Jeollanam-do (KR); Geon-soo Kim, Daejeon (KR); Chan-hong Lee, Daejeon (KR); Hyung-jin Kim, Jeollanam-do (KR)

(73) Assignee: LG Chem, Ltd. (KR)

( * ) Notice: Subject to any disclaimer, the term of this patent is extended or adjusted under 35 U.S.C. 154(b) by 40 days.

(21) Appl. No.: 12/522,021

(22) PCT Filed: Jan. 4, 2008

(86) PCT No.: PCT/KR2008/000040
§ 371 (c)(1),
(2), (4) Date: Oct. 23, 2009

(87) PCT Pub. No.: WO2008/088143
PCT Pub. Date: Jul. 24, 2008

(65) Prior Publication Data
US 2010/0063199 A1    Mar. 11, 2010

(30) Foreign Application Priority Data

Jan. 16, 2007  (KR) .................. 10-2007-0004717

(51) Int. Cl.
*C08J 3/22*      (2006.01)
*C08L 9/00*      (2006.01)
*C08F 36/00*     (2006.01)
*C08F 12/34*     (2006.01)
*C08F 220/06*    (2006.01)
*C08F 12/02*     (2006.01)

(52) U.S. Cl. ........ 524/525; 525/232; 526/335; 526/336; 526/317.1; 526/346

(58) Field of Classification Search ............... 524/525; 525/232; 526/335, 336, 317.1, 346
See application file for complete search history.

(56) References Cited

U.S. PATENT DOCUMENTS

| 3,049,505 A |   | 8/1962  | Grabowski |         |
|-------------|---|---------|-----------|---------|
| 4,306,040 A | * | 12/1981 | Baer      | 525/310 |
| 4,317,890 A |   | 3/1982  | Goyert et al. |     |
| 5,614,589 A |   | 3/1997  | Niznik et al. |     |
| 5,852,124 A |   | 12/1998 | Wang et al. |       |

FOREIGN PATENT DOCUMENTS

| CN | 1296513 A     | 5/2001 |
| JP | 50-014739     | 2/1975 |
| KR | 20040050468 A | 6/2004 |
| KR | 2007-0051450  | 5/2007 |

OTHER PUBLICATIONS

International Search Report, PCT/KR2008/000040, dated Apr. 16, 2009.
Office Action from corresponding Chinese Application 200880002309.7 dated Jul. 5, 2010.

* cited by examiner

*Primary Examiner* — William K Cheung
(74) *Attorney, Agent, or Firm* — Lerner, David, Littenberg, Krumholz & Mentlik, LLP

(57) ABSTRACT

The present invention relates to a graft copolymer for a transparent thermoplastic polyurethane resin prepared by graft copolymerization of (a) 50-85 weight % of rubber latex having a multi-layered structure composed of an inner layer and an outer layer comprising a conjugated diene monomer and an ethylenically unsaturated aromatic compound in which the refractive index of the inner layer is greater than that of the outer layer; and (b) 15-50 weight % of a $C_2$-$C_{20}$ vinyl monomer; a method for making same; and a thermoplastic polyurethane resin composition comprising same having excellent color properties, calendaring properties, low temperature impact strength and transparency.

10 Claims, No Drawings

US 7,968,643 B2

GRAFT COPOLYMER FOR TRANSPARENT THERMOPLASTIC POLYURETHANE RESIN, PREPARATION METHOD THEREOF, AND POLYURETHANE RESIN COMPOSITION CONTAINING THE SAME

CROSS REFERENCE TO RELATED APPLICATIONS

The present application is a national phase entry under 35 U.S.C. §371 of International Application No. PCT/KR2008/000040, filed Jan. 4, 2008, published in English, which claims priority from Korean Patent Application No. 10-2007-0004717, filed Jan. 16, 2007. The disclosures of said applications are incorporated by reference herein.

TECHNICAL FIELD

The present invention relates to a graft copolymer for transparent thermoplastic polyurethane resin, a preparation method thereof and a polyurethane resin composition containing the same, more precisely a graft copolymer for transparent thermoplastic polyurethane resin prepared by graft-copolymerization of rubber latex having multi-layered structure in which refraction index of the inner layer is higher than that of the outer layer, a preparation method thereof and a thermoplastic polyurethane resin composition having excellent color properties, calendaring properties, low temperature impact strength and transparency comprising the same.

BACKGROUND ART

To improve low temperature flexibility of transparent thermoplastic polyurethane (referred as "TPU" hereinafter) resin, the resin composition composed of TPU resin and graft rubber has been studied for a long while.

U.S. Pat. No. 3,049,505 (granted on Aug. 14, 1962) and U.S. Pat. No. 4,317,890 (granted on Mar. 2, 1982) describe a TPU resin composition composed of ABS (acrylonitrile-butadiene-styrene) graft copolymer and TPU resin. However, the problem of these inventions is the final resin composition becomes opaque owing to the difference of refraction index between the two major components.

Therefore, it is urgently requested to develop a novel TPU resin composition with improved transparency and low temperature impact strength as well.

DISCLOSURE OF INVENTION

Technical Problem

It is an object of the present invention, to overcome the above problem, to provide a graft copolymer for transparent thermoplastic resin having multi-layered structure in which refraction index of the inner layer is greater than that of the outer layer, and a preparation method of the same.

It is another object of the present invention to provide a thermoplastic polyurethane resin composition having excellent color properties, calendaring properties, low temperature impact strength and transparency comprising the graft copolymer.

Technical Solution

The above objects and other objects of the present invention can be achieved by the following embodiments of the present invention.

To achieve the above objects, the present invention provides a graft copolymer for transparent thermoplastic resin prepared by graft copolymerization of (a) 50-85 weight % of rubber latex having multi-layered structure composed of an inner layer and an outer layer comprising a conjugated diene monomer and an ethylenically unsaturated aromatic compound in which the refraction index of the inner layer is greater than that of the outer layer; and (b) 15-50 weight % of a $C_2$-$C_{20}$ vinyl monomer, and a preparation method of the same.

The present invention also provides a transparent thermoplastic polyurethane resin composition comprising 5-50 weight % of the graft copolymer for transparent thermoplastic polyurethane resin and 50-95 weight % of transparent thermoplastic polyurethane resin.

The present invention is described in detail hereinafter.

The present inventors confirmed during the production of a transparent thermoplastic polyurethane resin composition composed of TPU resin and graft copolymer that the properties of the transparent thermoplastic polyurethane resin composition such as color properties and low temperature impact strength could be improved via multi-step polymerization by regulating the refraction indexes of the inner and outer layers of rubber latex having multi-layered structure which was used as a substrate of the graft copolymer. Based on this confirmation, the present inventors completed this invention.

The graft copolymer for transparent thermoplastic polyurethane resin of the present invention is prepared by graft copolymerization of (a) 50-85 weight % of rubber latex having multi-layered structure composed of an inner layer and an outer layer comprising a conjugated diene monomer and an ethylenically unsaturated aromatic compound in which the refraction index of the inner layer is greater than that of the outer layer; and (b) 15-50 weight % of a $C_2$-$C_{20}$ vinyl monomer.

The rubber latex having multi-layered structure is composed of a conjugated diene monomer and an ethylenically unsaturated aromatic compound.

The conjugated diene monomer plays a role in increasing impact strength by absorbing impact given from outside and is one or more compounds selected from the group consisting of butadiene, isoprene and chloroisoprene, but not always limited thereto.

The ethylenically unsaturated aromatic compound plays a role in inhibiting light scattering generated by the difference of refraction index by regulating the refraction index of rubber latex to the same level as the refraction index of TPU resin and maintaining transparency, which is one or more compounds selected from the group consisting of styrene, alpha-methylstyrene, isopropenylnaphthalene, vinylnaphthalene, alkylstyrene in which one or more hydrogens of benzene ring are substituted with $C_1$-$C_3$ alkyl group, and alkylstyrene in which one or more hydrogens of benzene ring are substituted with halogen, but not always limited thereto.

The vinyl monomer is one or more compounds selected from the group consisting of alkyl(meth)acrylate and ethylenically unsaturated aromatic compound.

The alkyl(meth)acrylate plays a role in increasing compatibility of rubber latex with TPU resin, which is one or more compounds selected from the group consisting of methylmethacrylate, ethylmethacrylate, benzylmethacrylate, methylacrylate, ethylacrylate, butylacrylate, glycidylmethacrylate and hydroxyethylmethacrylate.

The ethylenically unsaturated aromatic compound plays a role in maintaining transparency and inhibiting light scattering generated by the difference of refraction indexes between graft copolymer and TPU resin by regulating the two different refraction indexes to the same level. At this time, this compound could be the same as the one used for the production of rubber latex.

When the content of the rubber latex having multi-layered structure is less than 50 weight %, low temperature impact strength is not improved. In the meantime, when the content of the rubber latex is higher than 85 weight %, compatibility of the graft copolymer produced from the rubber latex with TPU resin is so poor that transparency and impact strength are reduced.

The rubber latex having multi-layered structure can additionally include a cross-linking agent.

The cross-linking agent herein plays a role in regulating the degree of cross-linking of the rubber latex and can be one or more compounds selected from the group consisting of divinylbenzene, ethyleneglycoldimethacrylate, diethyleneglycoldimethacrylate, triethyleneglycoldimethacrylaye, 1,3-butyleneglycoldimethacrylate, arylmethacrylate and 1,3-butyleneglycoldiacrylate, but not always limited thereto.

The preferable content of the cross-linking agent is up to 5 weight % for the total weight of monomer mixture comprising conjugated diene monomer, ethylenically unsaturated aromatic compound and a cross-linking agent, and the more preferable content is up to 2 weight %. When the cross-linking agent content is within this range, the TPU resin composition can have excellent low temperature impact strength.

It is preferred for the rubber latex having multi-layered structure to be composed of the inner layer having higher refraction index than the outer layer. When the refraction index of the inner layer is higher than that of the outer layer, cooler properties and low temperature impact strength can be significantly improved.

The particle diameter and gel content of the rubber latex having multi-layered structure are not limited.

The method for preparing a graft copolymer for transparent thermoplastic polyurethane resin of the invention is characteristically composed of the following steps:

a) preparing rubber latex having multi-layered structure in which the refraction index of an inner layer is higher than that of an outer layer by the processes of i) preparing the inner layer of rubber latex by emulsion polymerization of 25-75 weight % of the total monomer mixture composed of a conjugated diene monomer, an ethylenically unsaturated aromatic compound and a cross-linking agent; and ii) preparing the outer layer of rubber latex by emulsion polymerization of the prepared inner layer after adding the remaining 25-75 weight % of the monomer mixture thereto; and b) preparing thermoplastic graft copolymer by one-step or multi-step graft polymerization of 50-85 weight % of the rubber latex having multi-layered structure prepared above and 15-50 weight % of a $C_2$-$C_{20}$ vinyl monomer.

The conjugated diene monomer, ethylenically unsaturated aromatic compound and the cross-linking agent of step i) are used to regulate glass transition temperature and the refraction index of the rubber latex, and the contents and types of them vary from the types of TPU resins and a target property.

A method for preparing the rubber latex having multi-layered structure of i) and ii) is not specifically limited and any method that is well-known to those in the art can be used.

The graft polymerization of step b) is performed by one-step or multi-step (at least two-steps) emulsion polymerization. At this time, for multi-step (at least two steps) emulsion polymerization, the content and composition of graft monomer can be determined according to the kinds of the monomer and refraction index of the target graft copolymer.

In preparation of the graft copolymer, a reaction medium, an initiator, an emulsifying agent, a catalyst and a stabilizer are not specifically limited and any one that is well-informed in this field can be used by generally known contents.

The emulsifying agent herein can be selected from those well-known to those in the art, and fatty acid salt such as fatty acid potassium salt and oleic acid potassium salt and alkali metal salt of weak acid are preferably used.

The polymerization initiator can be selected from the group consisting of such water soluble polymerization initiators as sodium persulfate, potassium persulfate and peroxy compound; and such fat soluble polymerization initiators as cumenehydro peroxide, diisopropyl benzenehydro peroxide, azobis isobutylnitrile, tertiary butylhydro peroxide, paramethanehydro peroxide and benzoyl peroxide.

The conditions for the polymerizations of the inside rubber latex, the rubber latex having multi-layered structure and the graft copolymer are not limited.

The transparent thermoplastic polyurethane resin composition of the present invention is characteristically composed of 5-50 weight % of the transparent thermoplastic graft copolymer and 50-95 weight % of the transparent thermoplastic polyurethane resin.

When the graft copolymer is used by less than 5 weigh%, low temperature impact strength and calendaring properties cannot be improved. On the other hand, when the graft copolymer is used by more than 50 weight %, mechanical strength of the resin composition is reduced.

The preferable difference of the refraction index between the graft copolymer and the polyurethane resin for the production of the transparent thermoplastic polyurethane resin composition is up to 0.01.

If the difference of the refraction index between the graft copolymer and the polyurethane resin is more than 0.01, the transparency of the thermoplastic polyurethane resin composition will be decreased.

The TPU resin is a rubber elastomer having urethane group (—NHCOO—) in its molecular structure, which can be processed by injection, extrusion, calendaring and T-Die method or apparatus. This resin has excellent mechanical strength, wear resistance, flex resistance, coloring properties and feeling in addition to the low risk of environmental hormone generation and less chance of air or soil contamination by burning, suggesting that this resin is pro-environmental.

If necessary, the transparent thermoplastic polyurethane resin composition of the invention can additionally include a processing oil, a lubricating oil, an anti-oxidant, a heat stabilizer, a lubricant and a pigment by the conventional contents.

The transparent thermoplastic polyurethane resin composition has been tested for transparency with ASTM D1003 Haze Meter. And the preferable Haze value for satisfactory transparency is up to 5 and the preferable b value for satisfactory color property is up to 10. Low temperature impact strength has been measured with the sample of 0.5 mm (thickness)×10 cm×14 cm after aging at −20° C. for 2 hours. The minimum rpm that breaks the sample, when circle saw blade spinning at 15 mm/sec is applied, is preferably at least 500 rpm.

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLES

The characteristics of the graft copolymers and transparent thermoplastic polyurethane resin compositions of examples 1-7 and comparative examples 1-10 were measured as follows and the results are shown in table 1 and table 2.

Refraction index—Each latex prepared in each step was heat-dried at 70° C. and refraction index of each resultant film was measured with a refractomer (Abbe Co.) at 25° C.

Calendaring properties—TPU resin composition was placed on a 160° C. roll, followed by melting and processing for 2 minutes. The processed sheet was separated from the surface of the roll. Failure in separation of the sheet from the surface of the roll is indicated as ×, success in separation with unclear surface is indicated as Δ, and success in separation with clear surface is indicated as ○.

Transparency—The sheet was cut into 3 mm thick samples by using a hot press for the measurement of transparency with an ASTM D1003 Haze meter. Haze values were obtained.

Low temperature impact strength—The sheet was cut into samples of 0.5 mm (thickness)×10 cm×14 cm, followed by aging at −20° C. for 2 hours. The minimum rpm that broke the sample, when circle saw blade spinning at 15 mm/sec was applied, was measured.

Color properties—The sheet was cut into 3 mm thick samples by using a hot press for the measurement of color properties with standard of ASTM D1003 and b value was obtained by using a SUGA color computer.

Example 1

(Preparation of Rubber Latex)

The 120 liter high pressure polymerization vessel equipped with a stirrer was filled with 100 weight part of the monomer, 150 weight part of ion exchange water, and the following additives, 0.5 weight part of buffer, 1.0 weight part of potassium oleate, 0.0047 weight part of ethylenediamine tetrasodiumacetate, 0.003 weight part of ferrous sulfate, 0.02 weight part of sodiumformaldehyde sulfoxylate and 0.1 weight part of diisopropylbenzene hydroperoxide.

To the vessel above were added 29 weight % of butadiene (BD), 20 weight % of styrene monomer (SM), and 1 weight % of divinylbenzene (DVB) for the total monomer content, followed by polymerization at 35° C. (step 1). When the polymerization conversion rate of the monomer reached at least 90%, 50 weight part of butadiene and 0.5 weight part of potassium oleate for the 100 weight part of the total monomer were added to the reaction mixture, followed by polymerization for 10 hours (step 2) to give styrene-butadiene rubber latex of 100 nm in particle diameter. The final polymerization conversion rate was 98%.

(Preparation of MBS Graft Copolymer)

To an air-tight reactor was added 70 weight % (solid content) of the rubber latex obtained above for the total rubber latex having multi-layered structure and monomer content. The reactor was filled with nitrogen, to which 0.0094 weight part of, 0.006 weight part of ferrous sulfate and 0.04 weight part of sodiumformaldehyde sulfoxylate were added for 100 weight part of the total rubber latex having multi-layered structure and monomer. Then, 18 weight % of methylmethacrylate (MMA), 0.18 weight part of potassium oleate, 18 weight part of ion exchange water and 0.05 weight part of t-butylhydro peroxide were additionally added thereto, followed by polymerization at 60° C. for 2 hours. Then, 12 weight % of styrene monomer (SM), 0.0094 weight part of ethylenediamine tetrasodium acetate, 0.006 weight part of ferrous sulfate, 0.04 weight part of sodiumformaldehyde sulfoxylate, 0.12 weight part of potassium oleate, 12 weight part of ion exchange water and 0.05 weight part of t-butylhydro peroxide were added, followed by further polymerization at 60° C. for 2 hours.

(Preparation of Graft Copolymer Powder)

To 100 weight part of the graft copolymer was added 0.5 weight part of an antioxidant (Irganox-245, Ciba) with stirring. 2.0 weight part of HCl was added to separate a polymer from water at 70° C., and the obtained polymer was dehydrated and dried to give graft copolymer powder.

(Preparation of TPU Resin Composition Samples)

75 weight % of TPU resin having the refraction index of 1.5320 (CS195A, SK Chemical) was mixed with 25 weight % of the graft copolymer powder. 0.5 mm thick sheet was prepared by using a 160° C. roll for the measurement of low temperature impact strength.

Example 2

An experiment was performed by the same manner as described in example 1 except that 25 weight % of butadiene (BD), 24 weight % of styrene (SM) and 1 weight % of divinylbenzene (DVB) were added in step 1 of the rubber latex polymerization and then 50 weight % of butadiene was added in step 2 of the polymerization.

Comparative Example 1

An experiment was performed by the same manner as described in example 1 except that 39.5 weight % of butadiene (BD), 10 weight % of styrene (SM) and 0.5 weight % of divinylbenzene (DVB) were added in step 1 of the rubber latex polymerization and then 39.5 weight % of butadiene, 10 weight % of styrene and 0.5 weight % of divinylbenzene were added in step 2 of the polymerization.

Comparative Example 2

An experiment was performed by the same manner as described in example 1 except that 50 weight % of butadiene (BD) was added in step 1 of the rubber latex polymerization and then 29 weight % of butadiene, 20 weight % of styrene (SM) and 1 weight % of divinylbenzene (DVB) were added in step 2 of the polymerization.

Comparative Example 3

An experiment was performed by the same manner as described in example 1 except that 50 weight % of butadiene (BD) was added in step 1 of the rubber latex polymerization and then 25 weight % of butadiene, 24 weight % of styrene (SM) and 1 weight % of divinylbenzene (DVB) were added in step 2 of the polymerization.

Comparative Example 4

An experiment was performed by the same manner as described in example 1 except that 79 weight % of butadiene (BD), 20 weight % of styrene (SM) and 1 weight % of divinylbenzene (DVB) were added at a time for the rubber latex polymerization.

TABLE 1

|  |  | Example | | Comparative Example | | | |
|---|---|---|---|---|---|---|---|
|  |  | 1 | 2 | 1 | 2 | 3 | 4 |
| Rubber latex having multi-layered structure | Inner layer (weight %) | BD 29 SM 20 DVB 1 | BD 25 SM 24 DVB 1 | BD 39.5 SM 10 DVB 0.5 | BD 50 | BD 50 | BD 79 SM 20 DVB 1 |
|  | Outer layer (weight %) | BD 50 | BD 50 | BD 39.5 SM 10 DVB 0.5 | BD 29 SM 20 DVB 1 | BD 25 SM 24 DVB 1 |  |
|  | Refraction index (inner layer/outer layer) | 1.5481/ 1.5170 | 1.5540/ 1.5170 | 1.5324/ 1.5324 | 1.5170/ 1.5481 | 1.5170/ 1.5540 | 1.5324 (monolayer) |
|  | Composition of monomer grafted (step 1/step 2) | MMA 18/ SM 12 | MMA 18/ SM 12 | MMA 18/ SM 12 | MMA 18/ SM 12 | MMA 18/ SM 12 | MMA 18/ SM 12 |
|  | Graft copolymer (weight %) | 25 | 25 | 25 | 25 | 25 | 25 |
|  | TPU resin (weight %) | 75 | 75 | 75 | 75 | 75 | 75 |
| Transparent thermoplastic TPU resin composition | Transparency (Haze) | 3.2 | 3.4 | 2.7 | 4.2 | 4.5 | 2.6 |
|  | Color property (b value) | 8.98 | 8.48 | 10.87 | 12.18 | 13.12 | 10.52 |
|  | Low temperature impact strength (rpm) | 750 | 720 | 490 | 330 | 300 | 470 |

As shown in Table 1, the transparent thermoplastic polyurethane resin compositions of the invention (examples 1-2) comprising the rubber latex having multi-layered structure in which refraction index of the inner layer is greater than that of the outer layer have excellent transparency, color properties and low temperature impact strength, compared with the compositions comprising the rubber latex having multi-layered structure in which refraction index of the inner layer is lower than that of the outer layer (comparative examples 1-3) and the composition comprising the rubber latex having monolayer structure (comparative example 4).

Example 3

An experiment was performed by the same manner as described in example 1 except that 12 weight % of styrene (SM) was added in step 1 of the graft polymerization and then 18 weight % of methylmethacrylate (MMA) was added in step 2 of the polymerization.

Example 4

An experiment was performed by the same manner as described in example 1 except that 24 weight % of methylmethacrylate (MMA) was added to 60 weight % of the rubber latex in step 1 of the graft polymerization and then 16 weight % of styrene (SM) was added in step 2 of the polymerization.

Example 5

An experiment was performed by the same manner as described in example 1 except that 12 weight % of methylmethacrylate (MMA) was added to 80 weight % of the rubber latex in step 1 of the graft polymerization and then 8 weight % of styrene (SM) was added in step 2 of the polymerization.

Example 6

An experiment was performed by the same manner as described in example 1 except that 16 weight % of methylmethacrylate (MMA) and 2 weight % of glycidylmethacrylate were added in step 1 of the graft polymerization and then 12 weight % of styrene (SM) was added in step 2 of the polymerization.

Example 7

An experiment was performed by the same manner as described in example 1 except that 16 weight % of methylmethacrylate (MMA) and 2 weight % of hydroxyethyl-methacrylate (HEMA) were added in step 1 of the graft polymerization and then 12 weight % of styrene (SM) was added in step 2 of the polymerization.

Comparative Example 5

An experiment was performed by the same manner as described in example 1 except that 6 weight % of methylmethacrylate (MMA) was added in step 1 of the graft polymerization and then 24 weight % of styrene (SM) was added in step 2 of the polymerization.

Comparative Example 6

An experiment was performed by the same manner as described in example 1 except that 28 weight % of methylmethacrylate (MMA) was added in step 1 of the graft polymerization and then 2 weight % of styrene (SM) was added in step 2 of the polymerization.

Comparative Example 7

An experiment was performed by the same manner as described in example 1 except that 32 weight % of methylmethacrylate (MMA) was added to 45 weight % of the rubber latex in step 1 of the graft polymerization and then 23 weight % of styrene (SM) was added in step 2 of the polymerization.

Comparative Example 8

An experiment was performed by the same manner as described in example 1 except that 6 weight % of methylmethacrylate (MMA) was added to 90 weight % of the rubber latex in step 1 of the graft polymerization and then 4 weight % of styrene (SM) was added in step 2 of the polymerization.

Comparative Example 9

An experiment was performed by the same manner as described in example 1 except that 40 weight % of TPU resin and 60 weight % of graft copolymer were used for preparing the TPU resin composition sample of example 1.

Comparative Example 10

An experiment was performed by the same manner as described in example 1 except that 99 weight % of TPU resin and 1 weight % of graft copolymer were used for preparing the TPU resin composition sample of example 1.

Even if the difference of refraction index between the graft copolymer and TPU resin was not more than 0.01, when the content of the graft copolymer was more than or less than the range of the invention, calendaring properties, transparency and low temperature impact strength of the transparent thermoplastic polyurethane resin compositions (comparative examples 9 and 10) were significantly reduced.

INDUSTRIAL APPLICABILITY

As explained hereinbefore, the present invention provides a graft copolymer for transparent thermoplastic polyurethane resin having multi-layered structure in which refraction index of the inner layer is higher than that of the outer layer that favors the improvement of low temperature impact strength of TPU resin co-used herein, and a preparing method of the same.

TABLE 2

| | Graft copolymer content (weight %) | Monomer composition for graft copolymer preparation (weight %) | | | Difference of refraction index between graft copolymer and TPU resin | Transparent thermoplastic polyurethane resin composition | | |
|---|---|---|---|---|---|---|---|---|
| | | Rubber latex | Step 1 graft | Step 2 graft | | Calendaring properties | Transparency (Haze) | Low temperature impact strength (rpm) |
| Example 1 | 25 | 70 | MMA 18 | SM 12 | 0.0002 | o | 3.2 | 750 |
| Example 3 | 25 | 70 | SM 12 | MMA 18 | 0.0001 | o | 3.0 | 680 |
| Example 4 | 25 | 60 | MMA 24 | SM 16 | 0.0005 | o | 2.8 | 610 |
| Example 5 | 25 | 80 | MMA 12 | SM 8 | 0 | o | 4.9 | 780 |
| Example 6 | 25 | 70 | MMA 16 GMA 2 | SM 12 | 0.001 | o | 3.6 | 820 |
| Example 7 | 25 | 70 | MMA 16 HEMA 2 | SM 12 | 0.001 | o | 3.1 | 790 |
| Comparative example 5 | 25 | 70 | MMA 6 | SM 24 | 0.012 | o | 8.0 | 540 |
| Comparative example 6 | 25 | 70 | MMA 28 | SM 2 | 0.0104 | o | 8.3 | 730 |
| Comparative example 7 | 25 | 45 | MMA 32 | SM 23 | 0 | o | 2.9 | 440 |
| Comparative example 8 | 25 | 90 | MMA 6 | SM 4 | 0.0002 | Δ | 10.2 | 320 |
| Comparative example 9 | 60 | 70 | MMA 18 | SM 12 | 0.0002 | o | 6.7 | 410 |
| Comparative example 10 | 1 | 70 | MMA 18 | SM 12 | 0.0002 | x | — | 210 |

As shown in Table 2, the transparent thermoplastic polyurethane resin compositions of the invention which included the graft copolymer and allowed the graft copolymer content and the difference of refraction index between TPU resin and the graft copolymer in the range of the invention (example 1 and examples 3-7) were confirmed to have excellent calendaring properties, transparency and low temperature impact strength.

However, even if the graft copolymer content was in the range of the present invention, when the difference of refraction index between the graft copolymer and TPU resin was more than 0.001 (comparative examples 5 and 6), calendaring properties and low temperature impact strength were maintained but transparency was significantly reduced.

On the other hand, even if the difference of refraction index between the graft copolymer and TPU resin was not more than 0.01, when the content of the rubber latex having multi-layered structure was more than or less than the range of the invention, calendaring properties, transparency and low temperature impact strength of the transparent thermoplastic polyurethane resin compositions (comparative examples 7 and 8) were significantly reduced.

The present invention also provides a thermoplastic polyurethane resin composition having excellent color properties, calendaring properties, low temperature impact strength and transparency.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A graft copolymer for a transparent thermoplastic polyurethane resin prepared by graft copolymerization of
    (a) 50-85 weight % of rubber latex having a multi-layered structure composed of an inner layer and an outer layer comprising a conjugated diene monomer and an ethylenically unsaturated aromatic compound in which the refractive index of the inner layer is greater than that of the outer layer; and
    (b) 15-50 weight % of a $C_2$-$C_{20}$ vinyl monomer.

2. The graft copolymer according to claim 1, wherein the conjugated diene monomer is one or more compounds selected from the group consisting of butadiene, isoprene and chloroisoprene.

3. The graft copolymer according to claim 1, wherein the ethylenically unsaturated aromatic compound is one or more compounds selected from the group consisting of styrene, alpha-methylstyrene, isopropenyl naphthalene, vinylnaphthalene, alkylstyrene in which one or more hydrogens of benzene ring are substituted with $C_1$-$C_3$ alkyl group, and alkylstyrene in which one or more hydrogens of benzene ring are substituted with halogen.

4. The graft copolymer according to claim 1, wherein the rubber latex having the multi-layered structure further comprises a cross-linking agent.

5. The graft copolymer according to claim 4, wherein the cross-linking agent is one or more compounds selected from the group consisting of divinylbenzene, ethyleneglycol dimethacrylate, di-ethyleneglycol dimethacrylate, triethyleneglycol dimethacrylaye, 1,3-butyl ethyleneglycol dimethacrylate, aryl methacrylate and 1,3-butyl ethyleneglycol diacrylate.

6. The graft copolymer according to claim 4, wherein the cross-linking agent is included by 1 to 5 weight % at maximum relative to the total content of the monomer mixture composed of the conjugated diene monomer, the ethylenically unsaturated aromatic compound and the cross-linking agent.

7. The graft copolymer according to claim 1, wherein the vinyl monomer is one or more compounds selected from the group consisting of alkyl acrylate, alkyl methacrylate and the ethylenically unsaturated aromatic compound.

8. A method for preparing a graft copolymer for a transparent thermoplastic polyurethane resin comprising the steps of:
  a) preparing rubber latex having a multi-layered structure in which the refractive index of an inner layer of the multi-layered structure is higher than that of an outer layer of the multi-layered structure by the processes of
  i) preparing the inner layer of rubber latex by emulsion polymerization of 25-75 weight % of the total monomer mixture composed of a conjugated diene monomer, an ethylenically unsaturated aromatic compound and a cross-linking agent; and
  ii) preparing the outer layer of rubber latex by emulsion polymerization of the prepared inner layer after adding the remaining 25-75 weight % of the monomer mixture thereto; and
  b) preparing the thermoplastic graft copolymer by graft polymerization in one-step or multi-steps of 50-85 weight % of the rubber latex having the multi-layered structure and 15-50 weight % of a $C_2$-$C_{20}$ vinyl monomer.

9. A transparent thermoplastic polyurethane resin composition comprising 5-50 weight % of the graft copolymer of claim 1, and 50-95 weight % of a transparent thermoplastic polyurethane resin, wherein the difference of the refractive index between the graft copolymer and the transparent thermoplastic polyurethane resin is up to 0.01.

10. The transparent thermoplastic polyurethane resin composition according to claim 9, further comprising one or more additives selected from the group consisting of a processing oil, a lubricating oil, an anti-oxidant, a heat stabilizer, a lubricant and a pigment.

* * * * *